J. A. SOUTHWELL.
AUTOMOBILE SIGNAL.
APPLICATION FILED JAN. 13, 1920.
1,383,870.
Patented July 5, 1921.
2 SHEETS—SHEET 1.
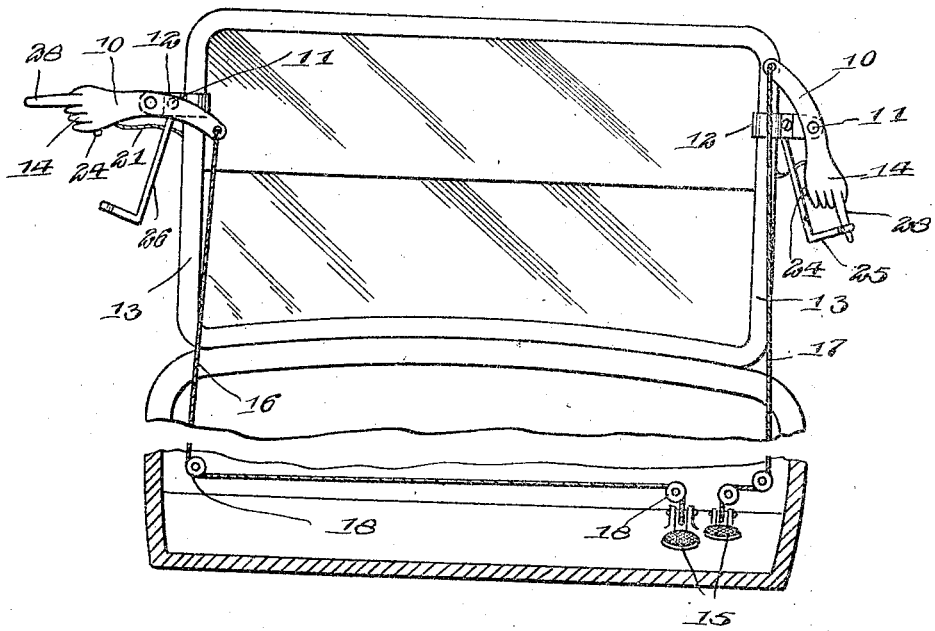
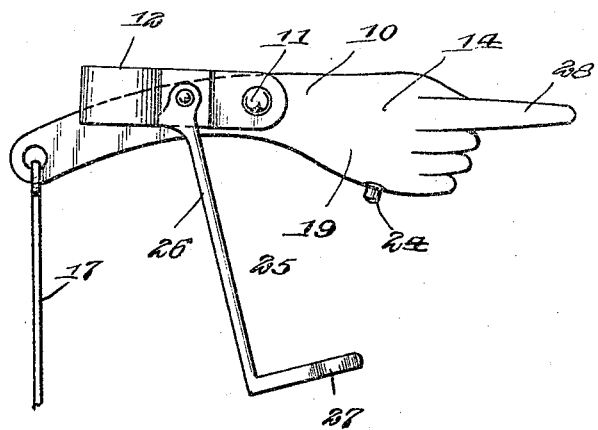
WITNESS:
F. L. Fox,
INVENTOR.
BY J. A. Southwell
Victor J. Evans
ATTORNEY.

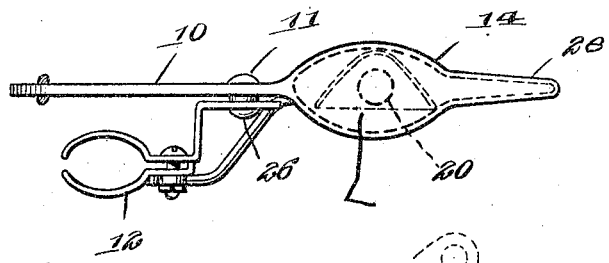
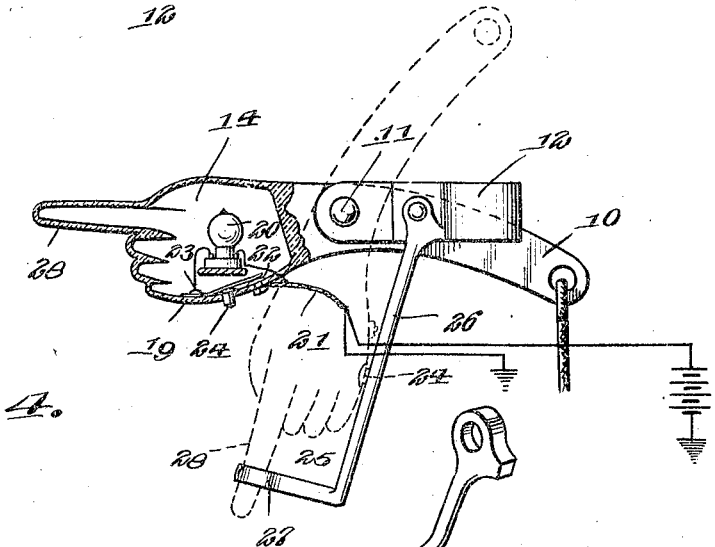
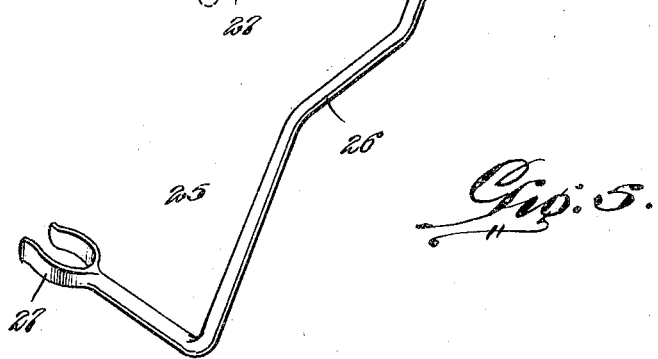

UNITED STATES PATENT OFFICE.

JOHN ARTHUR SOUTHWELL, OF SCRANTON, PENNSYLVANIA.

AUTOMOBILE-SIGNAL.

1,383,870.  Specification of Letters Patent.  Patented July 5, 1921.

Application filed January 13, 1920. Serial No. 351,186.

*To all whom it may concern:*

Be it known that I, JOHN A. SOUTHWELL, a citizen of the United States, residing at Scranton, in the county of Lackawanna and State of Pennsylvania, have invented new and useful Improvements in Automobile-Signals, of which the following is a specification.

The object of the invention is to provide a simple, inexpensive and efficient signaling device adapted for application to and use in connection with automobiles and similar motor driven vehicles as a means of enabling the driver to indicate to following vehicle drivers his intention to check his movement or turn either to the right or left, so as to serve as a guide to the following driver in the avoidance of collisions, and with this object in view, the invention consists in a construction and combination of parts of which a preferred embodiment is shown in the accompanying drawings, wherein:—

Figure 1 is an elevation of the apparatus applied to the dashboard of a vehicle, the operating elements of the members of the signaling device being arranged in position to enable the operator to display either or both of said members at will.

Fig. 2 is a detail front view of one of the signaling members and the connected parts.

Fig. 3 is a plan view of the same.

Fig. 4 is a sectional view showing the member in full lines in its extended and in dotted lines in its folded or inoperative position.

Fig. 5 is a detail of the rest by which the member is received when in its inoperative position.

The members of the signaling device consist respectively of arms 10 which are pivotally mounted at 11 in clamps 12 which are constructed for engagement with the side bars of the wind shield 13 of an automobile, the said arms terminating preferably at their outer ends in hands or representations of the human hand as indicated at 14, and being projected at their inner ends beyond the clamps for connection with the operating elements consisting in the construction illustrated of pedals 15.

These pedals are arranged close together so that either or both may be operated by one movement of the foot of the operator, to the end that either or both of the signaling members can be extended to indicate that the driver is about to turn to the right or to the left or is about to stop or check the forward movement of his vehicle, the connection with one of the signaling members preferably being effected by means of a cord or cable or chain 16 and with the other member by a cord 17 or the equivalent thereof. The cord or chain 16 extends around a suitable direction pulley 18 located conveniently with reference to the dashboard of the vehicle as indicated in Fig. 1.

Located in a suitable casing or housing 19 in the outer or hand portion of the signaling member is a lamp 20 of the incandescent type, suitable wiring connections 21 being made between the same and the lighting system of the automobile and arranged in this wiring connection is a circuit breaker consisting of the terminals 22 and 23 of which the latter is in the form of a spring tongue to which is attached a push button 24 projecting downwardly from the signaling member or arm and terminally projecting beyond the edge of the same. Also arranged adjacent to the frame of the wind shield and carried preferably by the clamp 12 above mentioned is a rest 25 adapted to form a seat for the signaling member when not in use or when folded and not serving its purpose of indicating direction to the driver of a following vehicle. Said rest in the construction illustrated consists of an arm 26 having its lower extremity extended and terminating in a clip 27 to the end that when the signal arm is in its folded position as indicated in dotted lines in Fig. 4, the lower edge of the hand portion bears against the arm 26 while the index finger 28 thereof is received by the clip 27 and is thereby held against vibration or rattling. The arms of the clip have an inward spring tendency, so as to clamp the arm between the same, and while this engagement necessitates the application of some force to the operating pedal in order to throw the arm to its operative or signaling position, the advantage is secured of preventing vibration and annoying rattling when the arm is not in use. When the arm is folded the push button 24 comes in contact with the arm 26 of the rest and by repressing the latter serves to break the circuit including the lamp, so that no light is shown by the hand except when extended for signaling purposes.

Having described the invention what is claimed is:—

A signaling device comprising a supporting member clamped upon the wind shield of a vehicle, a signal arm pivoted upon said support and having one end formed hollow and transparent and shaped to represent a human hand, an incandescent bulb within the hollow portion of the arm, a contact secured at the lower edge of the hollow portion of the arm, a leaf-spring located within said hollow portion and having one end connected with one terminal of the lamp and having its other end engageable with said contact, a source of current connected in circuit with said contact and with the lamp and spring, said spring engaging said contact to complete the circuit when the arm is in signaling position, an inclined arm depending from said support and serving as a stop for the signal arm when the latter is in inoperative position, and a plunger slidable through the lower side of said hollow portion and engageable with said spring whereby to disengage the latter from said contact when the plunger engages said inclined arm.

In testimony whereof I affix my signature.

JOHN ARTHUR SOUTHWELL.